(12) United States Patent
Saliba et al.

(10) Patent No.: US 8,392,791 B2
(45) Date of Patent: Mar. 5, 2013

(54) UNIFIED DATA PROTECTION AND DATA DE-DUPLICATION IN A STORAGE SYSTEM

(76) Inventors: George Saliba, Boulder, CO (US); Theron White, Boulder, CO (US)

( * ) Notice: Subject to any disclaimer, the term of this patent is extended or adjusted under 35 U.S.C. 154(b) by 973 days.

(21) Appl. No.: 12/188,876

(22) Filed: Aug. 8, 2008

(65) Prior Publication Data
US 2010/0037118 A1    Feb. 11, 2010

(51) Int. Cl.
  *G06F 11/00*    (2006.01)
(52) U.S. Cl. .................. 714/758; 714/764; 707/692
(58) Field of Classification Search .................. None
  See application file for complete search history.

(56) References Cited

U.S. PATENT DOCUMENTS

| | | | |
|---|---|---|---|
| 5,990,810 A | | 11/1999 | Williams |
| 6,381,241 B1 * | | 4/2002 | Ghirnikar et al. ............. 370/394 |
| 7,472,242 B1 * | | 12/2008 | Deshmukh et al. ........... 711/162 |
| 7,685,459 B1 * | | 3/2010 | De Spiegeleer et al. ..... 714/6.12 |
| 7,747,584 B1 * | | 6/2010 | Jernigan, IV ................. 707/692 |
| 7,822,939 B1 * | | 10/2010 | Veprinsky et al. ............ 711/170 |
| 7,836,009 B2 * | | 11/2010 | Paczkowski et al. ................. 1/1 |
| 7,913,114 B2 * | | 3/2011 | Leppard ........................... 714/15 |
| 7,979,670 B2 * | | 7/2011 | Saliba et al. ................... 711/216 |
| 2008/0016131 A1 * | | 1/2008 | Sandorfi et al. ............... 707/204 |
| 2008/0294696 A1 * | | 11/2008 | Frandzel ........................ 707/200 |
| 2009/0063795 A1 * | | 3/2009 | Yueh ............................. 711/162 |
| 2009/0193223 A1 * | | 7/2009 | Saliba et al. ................... 711/216 |
| 2011/0196848 A1 * | | 8/2011 | Anglin ........................... 707/692 |
| 2011/0213917 A1 * | | 9/2011 | Davis ............................. 711/103 |
| 2011/0246431 A1 * | | 10/2011 | Iitsuka .......................... 707/692 |

* cited by examiner

*Primary Examiner* — Christopher McCarthy

(57) ABSTRACT

A data storage system comprises a plurality of storage devices and a storage system controller. The storage system controller controls data and redundancy data stored to and read from the storage devices such that the data is stored at least in part in a region which comprises storage areas on least two of the storage devices and such that the storage devices appear as a single storage device to an entity external to the data storage system. The storage system controller comprises a redundancy data generator for generating the redundancy data, a de-duplication fingerprint definer to define a portion of the redundancy data as additionally representing a de-duplication fingerprint for the region, and a data de-duplicator to identify a duplicated region based upon finding a match to the de-duplication fingerprint within the redundancy data of the data storage system.

21 Claims, 8 Drawing Sheets

| Sector, Byte | Disk 121 | Disk 122 | Disk 123 | Disk 124 | Disk 125 |
|---|---|---|---|---|---|
| 0,0 | $R_0$ | $R_4$ | $R_8$ | $R_{12}$ | $P_{0,0,0}$ |
| 0,1 | $R_1$ | $R_5$ | $R_9$ | $R_{13}$ | $P_{0,0,1}$ |
| 0,2 | $R_2$ | $R_6$ | $R_{10}$ | $R_{14}$ | $P_{0,0,2}$ |
| 0,3 | $R_3$ | $R_7$ | $R_{11}$ | $R_{15}$ | $P_{0,0,3}$ |
| 0,4 | $R_{16}$ | $R_{20}$ | $R_{24}$ | $R_{28}$ | $P_{0,1,0}$ |
| 0,5 | $R_{17}$ | $R_{21}$ | $R_{25}$ | $R_{29}$ | $P_{0,1,1}$ |
| 0,6 | $R_{18}$ | $R_{22}$ | $R_{26}$ | $R_{30}$ | $P_{0,1,2}$ |
| 0,7 | $R_{19}$ | $R_{23}$ | $R_{27}$ | $R_{31}$ | $P_{0,1,3}$ |
| 0,8 | $R_{32}$ | $R_{36}$ | $R_{40}$ | $R_{44}$ | $P_{0,2,0}$ |
| 0,9 | $R_{33}$ | $R_{37}$ | $R_{41}$ | $R_{45}$ | $P_{0,2,1}$ |
| 0,10 | $R_{34}$ | $R_{38}$ | $R_{42}$ | $R_{46}$ | $P_{0,2,2}$ |
| 0,11 | $R_{35}$ | $R_{39}$ | $R_{43}$ | $R_{47}$ | $P_{0,2,3}$ |
| 0,12 | $R_{48}$ | $R_{52}$ | $R_{56}$ | --- | $P_{0,3,0}$ |
| 0,13 | $R_{49}$ | $R_{53}$ | --- | --- | $P_{0,3,1}$ |
| 0,14 | $R_{50}$ | $R_{54}$ | --- | --- | $P_{0,3,1}$ |
| 0,15 | $R_{51}$ | $R_{55}$ | --- | --- | $P_{0,3,3}$ |
| 1,0 | $S_0$ | $S_4$ | $S_8$ | $S_{12}$ | $P_{1,0,0}$ |
| 1,1 | $S_1$ | $S_5$ | $S_9$ | $S_{13}$ | $P_{1,0,1}$ |
| 1,2 | $S_2$ | $S_6$ | $S_{10}$ | $S_{14}$ | $P_{1,0,2}$ |
| 1,3 | $S_3$ | $S_7$ | $S_{11}$ | $S_{15}$ | $P_{1,0,3}$ |
| 1,4 | $S_{16}$ | $S_{20}$ | --- | --- | $P_{1,1,0}$ |
| 1,5 | $S_{17}$ | $S_{21}$ | --- | --- | $P_{1,1,1}$ |
| 1,6 | $S_{18}$ | $S_{22}$ | --- | --- | $P_{1,1,2}$ |
| 1,7 | $S_{19}$ | --- | --- | --- | $P_{1,1,3}$ |
| 1,8 | $T_0$ | $T_4$ | $T_8$ | $T_{12}$ | $P_{1,2,0}$ |
| 1,9 | $T_1$ | $T_5$ | $T_9$ | --- | $P_{1,2,1}$ |
| 1,10 | $T_2$ | $T_6$ | $T_{10}$ | --- | $P_{1,2,2}$ |
| 1,11 | $T_3$ | $T_7$ | $T_{11}$ | --- | $P_{1,2,3}$ |
| 1,12 | --- | --- | --- | --- | $P_{1,3,0}$ |
| 1,13 | --- | --- | --- | --- | $P_{1,3,1}$ |
| 1,14 | --- | --- | --- | --- | $P_{1,3,2}$ |
| 1,15 | --- | --- | --- | --- | $P_{1,3,3}$ |

FIG. 2

| Sector, Byte | Disk 121 | Disk 122 | Disk 123 | Disk 124 | Disk 125 |
|---|---|---|---|---|---|
| 0,0 | $R_0$ | $R_4$ | $R_8$ | $R_{12}$ | $P_{0,0,0}$ |
| 0,1 | $R_1$ | $R_5$ | $R_9$ | $R_{13}$ | $P_{0,0,1}$ |
| 0,2 | $R_2$ | $R_6$ | $R_{10}$ | $R_{14}$ | $P_{0,0,2}$ |
| 0,3 | $R_3$ | $R_7$ | $R_{11}$ | $R_{15}$ | $P_{0,0,3}$ |
| 0,4 | $R_{16}$ | $R_{20}$ | $R_{24}$ | $R_{28}$ | $P_{0,1,0}$ |
| 0,5 | $R_{17}$ | $R_{21}$ | $R_{25}$ | $R_{29}$ | $P_{0,1,1}$ |
| 0,6 | $R_{18}$ | $R_{22}$ | $R_{26}$ | $R_{30}$ | $P_{0,1,2}$ |
| 0,7 | $R_{19}$ | $R_{23}$ | $R_{27}$ | $R_{31}$ | $P_{0,1,3}$ |
| 0,8 | $R_{32}$ | $R_{36}$ | $R_{40}$ | $R_{44}$ | $P_{0,2,0}$ |
| 0,9 | $R_{33}$ | $R_{37}$ | $R_{41}$ | $R_{45}$ | $P_{0,2,1}$ |
| 0,10 | $R_{34}$ | $R_{38}$ | $R_{42}$ | $R_{46}$ | $P_{0,2,2}$ |
| 0,11 | $R_{35}$ | $R_{39}$ | $R_{43}$ | $R_{47}$ | $P_{0,2,3}$ |
| 0,12 | $R_{48}$ | $R_{52}$ | $R_{56}$ | $CRC_{R0}$ | $P_{0,3,0}$ |
| 0,13 | $R_{49}$ | $R_{53}$ | --- | $CRC_{R1}$ | $P_{0,3,1}$ |
| 0,14 | $R_{50}$ | $R_{54}$ | --- | $CRC_{R2}$ | $P_{0,3,1}$ |
| 0,15 | $R_{51}$ | $R_{55}$ | --- | $CRC_{R3}$ | $P_{0,3,3}$ |
| 1,0 | $S_0$ | $S_4$ | $S_8$ | $S_{12}$ | $P_{1,0,0}$ |
| 1,1 | $S_1$ | $S_5$ | $S_9$ | $S_{13}$ | $P_{1,0,1}$ |
| 1,2 | $S_2$ | $S_6$ | $S_{10}$ | $S_{14}$ | $P_{1,0,2}$ |
| 1,3 | $S_3$ | $S_7$ | $S_{11}$ | $S_{15}$ | $P_{1,0,3}$ |
| 1,4 | $S_{16}$ | $S_{20}$ | --- | $CRC_{S0}$ | $P_{1,1,0}$ |
| 1,5 | $S_{17}$ | $S_{21}$ | --- | $CRC_{S2}$ | $P_{1,1,1}$ |
| 1,6 | $S_{18}$ | $S_{22}$ | --- | $CRC_{S3}$ | $P_{1,1,2}$ |
| 1,7 | $S_{19}$ | --- | --- | $CRC_{S3}$ | $P_{1,1,3}$ |
| 1,8 | $T_0$ | $T_4$ | $T_8$ | $T_{12}$ | $P_{1,2,0}$ |
| 1,9 | $T_1$ | $T_5$ | $T_9$ | --- | $P_{1,2,1}$ |
| 1,10 | $T_2$ | $T_6$ | $T_{10}$ | --- | $P_{1,2,2}$ |
| 1,11 | $T_3$ | $T_7$ | $T_{11}$ | --- | $P_{1,2,3}$ |
| 1,12 | --- | --- | --- | $CRC_{T0}$ | $P_{1,3,0}$ |
| 1,13 | --- | --- | --- | $CRC_{T1}$ | $P_{1,3,1}$ |
| 1,14 | --- | --- | --- | $CRC_{T2}$ | $P_{1,3,2}$ |
| 1,15 | --- | --- | --- | $CRC_{T3}$ | $P_{1,3,3}$ |

FIG. 3

| Sector, Byte | Disk 121 | Disk 122 | Disk 123 | Disk 124 | Disk 125 |
|---|---|---|---|---|---|
| 0,0 | $R_0$ | $R_4$ | $R_8$ | $R_{12}$ | $P_{0,0,0}$ |
| 0,1 | $R_1$ | $R_5$ | $R_9$ | $R_{13}$ | $P_{0,0,1}$ |
| 0,2 | $R_2$ | $R_6$ | $R_{10}$ | $R_{14}$ | $P_{0,0,2}$ |
| 0,3 | $R_3$ | $R_7$ | $R_{11}$ | $R_{15}$ | $P_{0,0,3}$ |
| 0,4 | $R_{16}$ | $R_{20}$ | $R_{24}$ | $R_{28}$ | $P_{0,1,0}$ |
| 0,5 | $R_{17}$ | $R_{21}$ | $R_{25}$ | $R_{29}$ | $P_{0,1,1}$ |
| 0,6 | $R_{18}$ | $R_{22}$ | $R_{26}$ | $R_{30}$ | $P_{0,1,2}$ |
| 0,7 | $R_{19}$ | $R_{23}$ | $R_{27}$ | $R_{31}$ | $P_{0,1,3}$ |
| 0,8 | $R_{32}$ | $R_{36}$ | $R_{40}$ | $R_{44}$ | $P_{0,2,0}$ |
| 0,9 | $R_{33}$ | $R_{37}$ | $R_{41}$ | $R_{45}$ | $P_{0,2,1}$ |
| 0,10 | $R_{34}$ | $R_{38}$ | $R_{42}$ | $R_{46}$ | $P_{0,2,2}$ |
| 0,11 | $R_{35}$ | $R_{39}$ | $R_{43}$ | $R_{47}$ | $P_{0,2,3}$ |
| 0,12 | $R_{48}$ | $R_{52}$ | $R_{56}$ | $ECC_{R0}$ | $P_{0,3,0}$ |
| 0,13 | $R_{49}$ | $R_{53}$ | --- | $ECC_{R1}$ | $P_{0,3,1}$ |
| 0,14 | $R_{50}$ | $R_{54}$ | --- | $ECC_{R2}$ | $P_{0,3,2}$ |
| 0,15 | $R_{51}$ | $R_{55}$ | --- | $ECC_{R3}$ | $P_{0,3,3}$ |
| 1,0 | $S_0$ | $S_4$ | $S_8$ | $S_{12}$ | $P_{1,0,0}$ |
| 1,1 | $S_1$ | $S_5$ | $S_9$ | $S_{13}$ | $P_{1,0,1}$ |
| 1,2 | $S_2$ | $S_6$ | $S_{10}$ | $S_{14}$ | $P_{1,0,2}$ |
| 1,3 | $S_3$ | $S_7$ | $S_{11}$ | $S_{15}$ | $P_{1,0,3}$ |
| 1,4 | $S_{16}$ | $S_{20}$ | --- | $ECC_{S0}$ | $P_{1,1,0}$ |
| 1,5 | $S_{17}$ | $S_{21}$ | --- | $ECC_{S2}$ | $P_{1,1,1}$ |
| 1,6 | $S_{18}$ | $S_{22}$ | --- | $ECC_{S3}$ | $P_{1,1,2}$ |
| 1,7 | $S_{19}$ | --- | --- | $ECC_{S3}$ | $P_{1,1,3}$ |
| 1,8 | $T_0$ | $T_4$ | $T_8$ | $T_{12}$ | $P_{1,2,0}$ |
| 1,9 | $T_1$ | $T_5$ | $T_9$ | --- | $P_{1,2,1}$ |
| 1,10 | $T_2$ | $T_6$ | $T_{10}$ | --- | $P_{1,2,2}$ |
| 1,11 | $T_3$ | $T_7$ | $T_{11}$ | --- | $P_{1,2,3}$ |
| 1,12 | --- | --- | --- | $ECC_{U0}$ | $P_{1,3,0}$ |
| 1,13 | --- | --- | --- | $ECC_{U1}$ | $P_{1,3,1}$ |
| 1,14 | --- | --- | --- | $ECC_{U2}$ | $P_{1,3,2}$ |
| 1,15 | --- | --- | --- | $ECC_{U3}$ | $P_{1,3,3}$ |

FIG. 4

| Sector, Byte | Disk 121 | Disk 122 | Disk 123 | Disk 124 | Disk 125 |
|---|---|---|---|---|---|
| 0,0 | $R_0$ | $R_4$ | $R_8$ | $R_{12}$ | $P_{0,0,0}$ |
| 0,1 | $R_1$ | $R_5$ | $R_9$ | $R_{13}$ | $P_{0,0,1}$ |
| 0,2 | $R_2$ | $R_6$ | $R_{10}$ | $R_{14}$ | $P_{0,0,2}$ |
| 0,3 | $R_3$ | $R_7$ | $R_{11}$ | $R_{15}$ | $P_{0,0,3}$ |
| 0,4 | $R_{16}$ | $R_{20}$ | $R_{24}$ | $R_{28}$ | $P_{0,1,0}$ |
| 0,5 | $R_{17}$ | $R_{21}$ | $R_{25}$ | $R_{29}$ | $P_{0,1,1}$ |
| 0,6 | $R_{18}$ | $R_{22}$ | $R_{26}$ | $R_{30}$ | $P_{0,1,2}$ |
| 0,7 | $R_{19}$ | $R_{23}$ | $R_{27}$ | $R_{31}$ | $P_{0,1,3}$ |
| 0,8 | $R_{32}$ | $R_{36}$ | $R_{40}$ | $R_{44}$ | $P_{0,2,0}$ |
| 0,9 | $R_{33}$ | $R_{37}$ | $R_{41}$ | $R_{45}$ | $P_{0,2,1}$ |
| 0,10 | $R_{34}$ | $R_{38}$ | $R_{42}$ | $R_{46}$ | $P_{0,2,2}$ |
| 0,11 | $R_{35}$ | $R_{39}$ | $R_{43}$ | $R_{47}$ | $P_{0,2,3}$ |
| 0,12 | $R_{48}$ | $R_{52}$ | $R_{56}$ | $CRC_{R0}$ | $P_{0,3,0}$ |
| 0,13 | $R_{49}$ | $R_{53}$ | --- | $CRC_{R1}$ | $P_{0,3,1}$ |
| 0,14 | $R_{50}$ | $R_{54}$ | --- | $CRC_{R2}$ | $P_{0,3,1}$ |
| 0,15 | $R_{51}$ | $R_{55}$ | --- | $CRC_{R3}$ | $P_{0,3,3}$ |
| 1,0 | $S_0$ | $S_4$ | $S_8$ | $S_{12}$ | $P_{1,0,0}$ |
| 1,1 | $S_1$ | $S_5$ | $S_9$ | $S_{13}$ | $P_{1,0,1}$ |
| 1,2 | $S_2$ | $S_6$ | $S_{10}$ | $S_{14}$ | $P_{1,0,2}$ |
| 1,3 | $S_3$ | $S_7$ | $S_{11}$ | $S_{15}$ | $P_{1,0,3}$ |
| 1,4 | $S_{16}$ | $S_{20}$ | --- | $CRC_{S0}$ | $P_{1,1,0}$ |
| 1,5 | $S_{17}$ | $S_{21}$ | --- | $CRC_{S2}$ | $P_{1,1,1}$ |
| 1,6 | $S_{18}$ | $S_{22}$ | --- | $CRC_{S3}$ | $P_{1,1,2}$ |
| 1,7 | $S_{19}$ | --- | --- | $CRC_{S3}$ | $P_{1,1,3}$ |
| 1,8 | $U_0$ | $U_4$ | $U_8$ | $U_{12}$ | $P_{1,2,0}$ |
| 1,9 | $U_1$ | $U_5$ | $U_9$ | $U_{13}$ | $P_{1,2,1}$ |
| 1,10 | $U_2$ | $U_6$ | $U_{10}$ | $U_{14}$ | $P_{1,2,2}$ |
| 1,11 | $U_3$ | $U_7$ | $U_{11}$ | $U_{15}$ | $P_{1,2,3}$ |
| 1,12 | $U_{16}$ | $U_{20}$ | --- | $CRC_{U0}$ | $P_{1,3,0}$ |
| 1,13 | $U_{17}$ | $U_{21}$ | --- | $CRC_{U1}$ | $P_{1,3,1}$ |
| 1,14 | $U_{18}$ | $U_{22}$ | --- | $CRC_{U2}$ | $P_{1,3,2}$ |
| 1,15 | $U_{19}$ | --- | --- | $CRC_{U3}$ | $P_{1,3,3}$ |

FIG. 6

ACCESS REDUNDANCY DATA OF A REDUNDANT ARRAY OF INDEPENDENT DISKS (RAID), THE REDUNDANCY DATA SUITABLE TO RECONSTRUCT A LOST OR DAMAGED PORTION OF DATA STORED IN A REGION OF THE RAID BASED UPON THE REDUNDANCY DATA AND A REMAINING VALID PORTION OF THE DATA, THE REGION COMPRISING STORAGE SPACE ON AT LEAST TWO DISKS OF THE RAID.
710

DEFINE A PORTION OF THE REDUNDANCY DATA AS A DE-DUPLICATION FINGERPRINT FOR THE REGION, THE PORTION OF REDUNDANCY DATA COMPRISING REDUNDANCY DATA FOR THE REGION.
720

DETERMINE A DUPLICATED REGION WITHIN THE RAID BY COMPARING THE DE-DUPLICATION FINGERPRINT FOR A MATCH WITHIN THE REDUNDANCY DATA, WHEREIN THE DUPLICATED REGION COMPRISES DUPLICATE DATA OF THE REGION.
730

PERFORM DATA DE-DUPLICATION OF THE DUPLICATED REGION SUCH THAT AVAILABLE DATA STORAGE SPACE WITHIN THE RAID IS INCREASED FOLLOWING THE DATA DE-DUPLICATION.
740

FIG. 7

UNIFIED DATA PROTECTION AND DATA DE-DUPLICATION IN A STORAGE SYSTEM

BACKGROUND

In the field of data storage, if a single storage device fails or a portion of its data is damaged, the lost/damaged data is often unrecoverable. A common approach to increase the robustness of data storage is to store data in redundant data storage system, such as a redundant array of independent disks (RAID). Many standard and proprietary RAID architectures, typically hardware implementations, are known. Most RAID implementations distribute the storage of data across multiple disks and include the storage of some type of redundancy data which assists in the recovery of lost or damaged data. Thus, a RAID implementation dedicates a certain amount of overhead storage space to store redundancy data, even though the redundancy data uses space which could store additional data.

Often a large portion of data stored in a redundant data storage system, such as a RAID, is repetitive data. Repetitive data is different than redundant data stored for data protection purposes. Consider an example where an electronic message ("e-mail") is sent to 100 recipients, it may be stored 100 times in a data storage system. All but the first instance of this e-mail constitute some amount of repetition. In another example, multiple copies of slightly different versions of a word processing document are stored in a data storage system. A large portion of each of the documents is likely to constitute repetition of data stored in conjunction with one or more of the other instances of the word processing document.

Data de-duplication is sometimes used to reduce the amount of repetitive data stored in a data storage system. Presently most data de-duplication is performed in software which executes on the processor of a computer which uses or is coupled with a data storage system. De-duplication often involves hashing data segments to identify duplicate data segments, then replacing an identified duplicate data segment with a smaller reference such as a pointer, code, dictionary count, or the like, which references a data segment, pointer, or the like stored in a de-duplication library. Thus, performing data de-duplication adds additional overhead space which is dedicated to some sort of a de-duplication library. When data de-duplication is performed on a large data set or on very short data segments, a large library can result as well as a heavy processing burden. It is even possible, in some situations, for space dedicated to creating a library to exceed space saved by de-duplication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A data storage system comprises a plurality of storage devices and a storage system controller. The storage system controller controls data and redundancy data stored to and read from the storage devices such that the data is stored at least in part in a region which comprises storage areas on least two of the storage devices and such that the storage devices appear as a single storage device to an entity external to the data storage system. The storage system controller comprises a redundancy data generator for generating the redundancy data, a de-duplication fingerprint definer to define a portion of the redundancy data as additionally representing a de-duplication fingerprint for the region, and a data de-duplicator to identify a duplicated region based upon finding a match to the de-duplication fingerprint within the redundancy data of the data storage system. The data de-duplicator can additionally perform a de-duplication of the duplicated region, such that available data storage space within the data storage system is increased following the data de-duplication. In some embodiments, the storage system controller comprises, all or in part, a hardware device. In some embodiments, the storage system controller comprises all or in part a virtual device implemented by a processor executing instructions which cause the processor to perform a function of the storage system controller.

DESCRIPTION OF THE DRAWINGS

The accompanying drawings, which are incorporated in and form a part of this specification, illustrate embodiments of the subject matter and, together with the description, serve to explain principles discussed below.

FIG. 2 shows an example of stored data in conjunction with unified redundancy data and de-duplication fingerprints, according to an embodiment.

FIG. 3 shows an example of stored data in conjunction with unified redundancy data and de-duplication fingerprints, according to an embodiment.

FIG. 4 shows an example of stored data in conjunction with unified redundancy data and de-duplication fingerprints, according to an embodiment.

FIG. 6 shows an example of stored data, unified redundancy data and de-duplication fingerprints, and matching de-duplication fingerprints, according to an embodiment.

FIG. 7 shows a flow diagram of an example method of determining duplicated data in a redundant array of independent disks (RAID), according to an embodiment.

Figure 1:
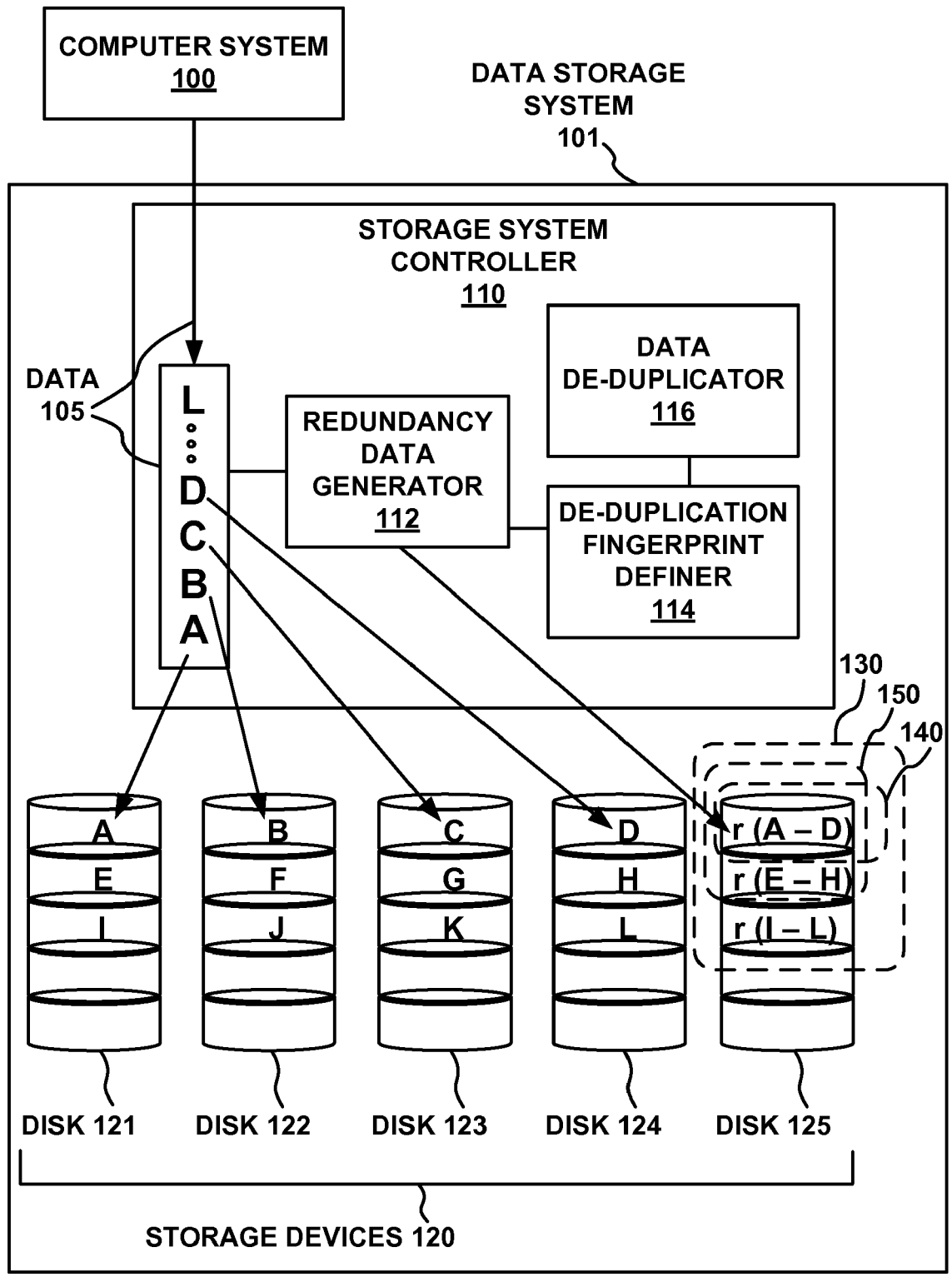
FIG. 1 is a block diagram of an example data storage system and storage system controller, in accordance with an embodiment of the subject matter described herein.

The drawings referred to in this description should be understood as not being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following detailed description, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the detailed description, discussions utilizing terms such as "controlling," "defining," "identifying," "performing," "receiving," "using," "generating," "employing," "accessing," "determining," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices. In some embodiments, as described herein, a storage system controller resides within and/or is coupled with a data storage system or a computer system. In some embodiments, a storage system controller, as described herein, is implemented as a hardware device, such as a circuit card or an application specific integrated circuit. In some embodiments, a storage system controller, as described herein, is implemented as a virtual device in the form of computer executable instructions executed on a processor to cause the processor to perform one or more functions of the storage system controller.

Overview of Discussion

In multi-disk storage arrays, such as, for example, redundant arrays of independent disks (RAIDs), a certain amount of redundancy data is typically stored along with stored data. In a multi-storage device array (e.g., three disks) when data stored on one of the storage devices is lost or damaged, the redundancy data can be used in conjunction with a remaining valid portion of the data which is stored, for example, on another storage device of the array, to reconstruct the lost or damaged data. In some implementations of a multi-storage device array, such as a RAID, one or more disks in the array is set aside to solely store the redundancy information, while in other implementations the redundancy information is interleaved with stored data on some or all of the disks of the array. Other additional implementations, such as combinations of dedicated disks and interleaving are possible.

Typically, when data de-duplication is presently performed in a multi-storage device array, a separate and significant additional amount of storage space (above and beyond that of the redundancy data) in the multi-storage device array would need to be set aside as some sort of de-duplication library. Presently, when performing data de-duplication, numerous trade-offs are made in order to extract the benefits of de-duplication (increased storage space) while preventing the size of a de-duplication library from growing larger that a pre-specified percentage of the size of a storage system, preventing the overuse of a computer's processing power for de-duplication efforts, and in some instances preventing a de-duplication library from growing larger than the space which is saved by performing data de-duplication. An example of such a trade-off is settling on a longer minimum length of the data segment which is hashed for data de-duplication (rather than a shorter minimum length) so that fewer processing cycles are used for data-duplication or so that a de-duplication library is kept within some particular size constraint.

The subject matter described herein, describes how existing redundancy data of a multi-storage device array can be used in a unified fashion for purposes of data protection (redundancy) and as a robust data de-duplication library. As will be described herein, without any additional hashing or other calculations, subsets of the existing or slightly supplemented redundancy data in a multi-storage device array, such as a RAID, can be used as de-duplication fingerprints. These de-duplication fingerprints can then be compared within the redundancy data to identify duplicated data stored within the data storage system. This allows data de-duplication to be performed on the data of the data storage system while adding little, if any, storage overhead to the existing storage overhead of redundancy data, and in any case far less than would be required for a separate de-duplication library. The data de-duplication as described herein can be performed without additional hashing (or similar activity) being performed on the stored data of the data storage system. This frees up processing cycles and eliminates data accessing that would otherwise have been required using other forms of data de-duplication.

Discussion will begin with a description of an example data storage system and storage system controller with which, or upon which, embodiments described herein may operate. Components of data storage system and storage system controller will be described. Discussion will proceed to a description of several examples of data storage techniques and de-duplication fingerprints, which allow unified data protection and data de-duplication in a data storage system. Operation of an example data storage system and data storage controller will then be described in more detail in conjunction with a description of an example method of unified data protection and data de-duplication in a data storage system. Operation of an example data storage system and data storage controller will then be further described in conjunction with a description of an example method of determining duplicated data in a RAID.

Example Data Storage System

FIG. 1 is a diagram of an example data storage system 101 incorporating an embodiment of the subject matter described herein. As shown in FIG. 1, in one embodiment, data storage system 101 comprises storage system controller 110 which is communicatively coupled with a plurality of storage devices 120. Storage system controller 110, in one embodiment, comprises redundancy data generator 112, de-duplication fingerprint definer 114, and data de-duplicator 116; all of which are communicatively coupled with one another to facilitate inter-operation and the exchange of information within storage system controller 110. It is appreciated that the functions performed by the illustrated components of storage system controller 110 can, in some embodiments, be consolidated, split apart, and even performed by additional components. It is also appreciated that, in some embodiments, storage system controller 110 can have a greater number of components, lesser number of components, or different components than those illustrated in FIG. 1. However, for clarity of explanation, the functions of the components will be described as if they are solely associated with the components which are illustrated in FIG. 1.

As shown in FIG. 1, data storage system 101 receives data 105 from some source such as computer system 100. Storage system controller 110 directs the storage of data 105 within a multi-storage device array, such as storage devices 120. Although not depicted, storage system controller 110 also directs the retrieval of stored data when such data is accessed by or supplied to an entity, such as computer system 100.

Storage devices 120 represent a plurality of storage devices which are arranged in a redundant array. A typical implementation of such storage devices 120 is a Redundant Array of Independent Disks (RAID). As illustrated in FIG. 1, a basic five hard disk drive version of a level-3 RAID is shown, which comprises hard "disk" drives 121, 122, 123, 124, 125. Typically, multi-storage device arrays, such as storage devices 120, employ similar or identical storage devices, which have similar capacity and response characteristics to one another. "Disks" 121, 122, 123, 124, 125 are illustrated in FIG. 1, as hard disk drives, because hard disk drives are typically used for implementations of redundant arrays of storage devices, such as storage devices 120. However, other storage devices, such as Compact Disk-Read Only Memory (CD-ROM) disks and drives, Digital Versatile Disk (DVD) disks and drives, tapes and tape drives, solid state memory devices, and the like can also be used as storage devices 120, in some embodiments.

Moreover, though storage devices 120 are illustrated as a basic level-3 raid comprising five storage devices, it is appreciated that the unified data protection and de-duplication described herein is equally applicable and useable with a greater or lesser number of storage devices, and/or other redundant multi-storage device arrays, such as level-2, level-4, level-5, level-6, level-7, and numerous, combinations of single RAID levels, non-standard RAID implementations, and/or proprietary RAID implementations. However, the subject matter described herein is not applicable to RAID level-0, which has no data striping but not redundancy. Additionally, the subjected matter described herein is not applicable to RAID level-1, which simply provides a second storage unit as a mirror of the first storage unit but does not perform data striping. Thus, by "redundancy data" what is meant herein is not simple mirroring or repetition of the stored data, but rather, parity data, cyclic redundancy check data, error correction code (ECC) data, or the like, which is generated from and for data stored in the data storage system.

Storage system controller 110 controls reading and writing to storage devices 120 and thus controls data and redundancy data 130 stored to and read from storage devices 120. Storage system controller 110 controls the storage of received data 105 so that data 105 is stored, at least in part, by striping it into a region which comprises storage areas on least two of the storage devices (e.g., two of disks 121, 122, 123, 124, and 125) of storage devices 120. As shown in FIG. 1, data 105 which comprises data stream A, B, C, D, . . . L is striped such that portions of the data stream are stored on each of disks 121, 122, 123, and 124 while redundancy data 130 ( e.g., r(A-D), r(E-H), and r(I-L) ), generated for data 105, is stored on disk 125. For example, with respect to example data 105, data portion A, is stored on disk 121, data portion B is stored on disk 122, data portion C is stored on disk 123, data portion D is stored on disk 124, and redundancy data r(A-D) for the region of data portions A through D is generated and stored on disk 125. In the example illustrated by FIG. 1, this pattern of data striping and redundancy data generation and storage continues until all of data 105 has been stored within storage devices 120.

Storage system controller 110 also controls data storage and retrieval such that even though received data is stored by striping to a plurality of storage devices along with redundancy data 130, storage devices 120 appear as a single storage device to an entity, such as computer system 100, which is external to data system 101. Data storage system 101 maintains this "single storage device" appearance to external entities by using one or more techniques such as storage address translation and virtualization. For example, in one embodiment, data storage system 101 translates storage addresses between perceived/directed addresses received from or supplied to an outside entity and the actual storage addresses for data that are used within storage devices 120.

In one embodiment, storage system controller 110 is implemented all or in part as a hardware device such as an Application Specific Integrated Circuit (ASIC), integrated circuit, RAID controller card/board, circuit card/board or the like. In other embodiments, all or some portion of the functionality of storage system controller 110 can comprise a virtual device implemented as instructions which are executed by a processor, such as a microcontroller/processor of a RAID controller card/board or such as a processor of computer system 100. In an embodiment where all or a portion of storage system controller 110 is being implemented as a virtual device, the processor, when executing instructions read from a computer readable medium, performs a function of at least one component (e.g., redundancy data generator 112, de-duplication fingerprint definer 114, and/or data de-duplicator 116) of storage system controller 110.

Redundancy data generator 112 generates redundancy data 130 from and for received data, such as data 105. Redundancy data 130 is suitable to reconstruct a lost or damaged portion of the received and stored data (e.g., data 105), or some region thereof, based upon content of redundancy data 130 and a remaining valid portion of the data for which redundancy data 130 has been generated. With reference to FIG. 1, consider an example where data portion A is lost or damaged. In such an example, redundancy data r(A-D) in combination with remaining valid data portions B, C, and D will be sufficient to reconstruct the content of data portion A. In this example, redundancy data 130 is robust enough to provide protection against lost or corrupted data striped to one disk. In other embodiments, redundancy data 130 is generated to provide more robust data protection which allows reconstruction of simultaneous lost/damaged data from multiple disks (e.g., data portions A and B). As before, the reconstruction is based upon the redundancy data r(A-D) and the remaining valid data from a region of data (e.g. data portions A through D) for which redundancy data 130 has been generated. In this example r(A-D) and valid data portions D and C are used to reconstruct data portions A and B. The trade-off encountered when using more robust redundancy data 130 is that typically more overhead is consumed for storage of redundancy data 130 within storage devices 120 than would be required for redundancy data 130 of a less robust nature. A by-product of using more robust redundancy data is that stronger de-duplication fingerprints can be defined from the redundancy data.

Some examples of redundancy data 130 which redundancy data generator 112 generates, in various embodiments, include: parity data, cyclic redundancy check (CRC) data, and/or error correction code (ECC) data. With respect to the ECC data, a variety of codes can be utilized by redundancy data generator 112, in various embodiments. Some examples include generating Hamming code ECC data and generating Reed-Solomon code ECC data for all or a portion of a region of data which is received for storage in data storage system 101. The nature (e.g., type and robustness) of redundancy data 130 is dependent on at least two factors, the robustness of the redundancy desired by a user and/or by the defacto architecture of the array of storage devices 120 (e.g., RAID level-3, RAID level-4, RAID level-5, RAID level-6, RAID level-7, or some other array architecture). Thus, in one embodiment, redundancy data r(A-D) represents parity data for the region of data portions A through D. In another embodiment, redundancy data r(A-D) represents an ECC for the region of data portions A through D. In another embodiment, redundancy data r(A-D) represents parity data and CRC data for the region of data portions A through D. In yet another embodiment, redundancy data r(A-D) represents some other combination of or type of redundancy data for the striped region comprising data portions A through D.

In FIG. 1, redundancy data 130 is stored on disk 125. In the illustrated example embodiment, disk 125 is used exclusively for storage of redundancy data 130. However, it is appreciated that in other embodiments, depending upon the architecture implemented for the array of storage devices 120, the data (e.g. data 105) and redundancy data (e.g., redundancy data 130) can be stored in different fashions than those illustrated by FIG. 1. Some examples include: striped data and redundancy data being interleaved with one another on all of the storage devices of an array of storage devices; some redundancy data being interleaved or stored in blocks along with stored data while some redundancy data is stored on a separate storage device of the array of storage devices; and/or multiple separate storage devices of an array of storage devices being used exclusively for storing redundancy data.

De-duplication fingerprint definer 114 defines a portion of the existing redundancy data, which has been generated for data protection purposes, as additionally representing a de-duplication fingerprint for the region of data for which the redundancy data has been generated. For example, de-duplication fingerprint definer 114 utilizes existing redundancy data 130, or some subset thereof, as a de-duplication fingerprint. In the case where storage devices 120 are configured as a RAID, the de-duplication fingerprint typically comprises RAID redundancy data or some subset thereof. Using redundancy data 130 for this dual purpose as a de-duplication fingerprint differs significantly from the manner in which anything like a de-duplication fingerprint would currently be generated by other forms of data de-duplication. This is because other data de-duplication procedures would require data (e.g., data 105) to be hashed or analyzed separately for de-duplication purposes.

Consider an example embodiment of the subject matter, where redundancy data 130 of FIG. 1 is parity data. Parity data r(A-D) is associated with a striped region comprising data portions A through D. In one embodiment, de-duplication fingerprint definer 114 defines parity data r(A-D) as a de-duplication fingerprint 140 for the data region comprising data portion A through redundancy data r(A-D). This is possible, because in addition to serving its data protection purposes, parity data r(A-D) also comprises a fairly unique data pattern which can searched within redundancy data 130 (or a larger set of redundancy data) to find identical parity data. If found, such identical parity data will, with strong likelihood, be associated with a data region identical to the data region comprising data portion A through redundancy data r(A-D). It should be appreciated that though data de-duplication fingerprint 140 is a very simplistic example, it nonetheless operates to identify very likely candidates of data regions for de-duplication when compared for matches within a large set of redundancy data stored in data storage system 101.

In practice, the likelihood/odds of finding an exactly matching data pattern are increased when de-duplication fingerprint definer 114 defines a more unique sequence of redundancy data as a de-duplication fingerprint. For example, a longer de-duplication fingerprint 150 comprised of redundancy data r(A-H) is associated with a data region comprising data portion A through redundancy data r(E-H). Likewise, all of the redundancy data r(A-L) shown in FIG. 1 can be defined as a redundancy fingerprint for a data region comprising data portion A through redundancy data r(I-L), while simultaneously acting as redundancy data 130. These longer sequences of redundancy data are more unique, and thus increase the odds that any detected matching sequence of redundancy data is associated with an identical or duplicate region of data. Similarly, additional or other redundancy data besides parity data can be used as or within a de-duplication fingerprint to provide more uniqueness. As an example, when ECC data is used as or within a de-duplication fingerprint, the de-duplication fingerprint may equate to or comprise a data "syndrome," such as a Reed-Solomon code syndrome. Redundancy data generator 112 generates such a syndrome in accordance as all or part of the redundancy data for a region of data, such as data 105. By lengthening and/or otherwise increasing the uniqueness of a de-duplication fingerprint the odds of a matching range of redundancy data being associated with identical data can be increased to the point of near certainty.

It is appreciated that a de-duplication fingerprint which is defined by de-duplication fingerprint definer 114 is similar in some ways to a hash value which is obtained in a de-duplication process which hashes data 105 to determine buckets of likely sets of matching data. However, a de-duplication fingerprint defined by de-duplication fingerprint definer 114 is different from a hash value or the like, at least in that no additional hashing needs to be performed to obtain the de-duplication fingerprint, and in that a separate overhead storage space for hash buckets and/or a separate data de-duplication library is not required. Instead, as describe herein, the existing or slightly supplemented redundancy data used for data protection purposes in a data storage system is also used in a unified fashion as a data de-duplication library Data de-duplicator 116 identifies a duplicated region of striped data and redundancy data upon finding a match to a de-duplication fingerprint within a set of redundancy data of data storage system 101. As described above, this identification of a duplicated region of data in storage devices 120 can be done with a very high degree of certainty when a very unique de-duplication fingerprint is used. Thus, in many or most cases, an identified duplicated region within storage devices 120 is identical to the region of storage devices 120 which is represented by the de-duplication fingerprint. At minimum, any de-duplication fingerprint match represents a very good candidate region of storage devices 120 which can be further compared, if desired, to determine with certainty that it is identical to the region represented by the de-duplication fingerprint. For example, after identification a bit by bit comparison can be performed.

After a duplicate region has been identified, in one embodiment, data de-duplicator 116 performs a de-duplication of the duplicated region, such that available data storage space within the data storage system (e.g. data storage system 101) is increased following the data de-duplication. From this point forward, techniques similar to those employed with conventional de-duplication techniques can be utilized. For example, in one embodiment, a short pointer to range of data within storage devices 120, which is represented by the de-duplication fingerprint, can be stored in place of a longer region of data which was identified as duplicated. All or a portion of portion the remaining space previously occupied by the duplicated region then becomes freed up space and can be used to store additional non-duplicated data.

Examples of Stored Data with Unified Redundancy Data and De-duplication Fingerprints FIGS. 2, 3, and 4 show several non-limiting examples of more detailed examples of implementations of stored data in a multi-storage device storage system in conjunction with unified redundancy data and de-duplication fingerprints. These examples are provided to better illustrate some embodiments of the subject matter described herein. However, these examples are not intended to limit the subject matter to the described embodiments or illustrated implementations, as it is realized that there are numerous additional storage system embodiments, RAID levels, and the like to which the described concepts can similarly be applied. In order to better illustrate the concepts, several example implementations using simple data storage system are shown and described herein. For ease of illustration, the sectors shown are much smaller than actual sectors, which typically encompass 512 or more bytes. Additionally, more complex features such as interleaving data and redundancy data, rotating the storage of data and redundancy data among all of the storage devices, and combining features of different RAID levels have not been illustrated so as not to obscure the illustrated concepts. However, it is appreciated that the concepts illustrated in the examples below also work with and are extensible to more complex data storage system implementations than those which have been presented for purposes of illustration.

FIG. 2 shows an example 200 of stored data in conjunction with unified redundancy data and de-duplication fingerprints, according to an embodiment. More particularly, example 200 shows a five disk simplified RAID (without interleaved parity for simplicity of presentation and discussion). The RAID of example 200 is very similar to implementation of storage devices 120 shown in FIG. 1. As previously described, many RAID implementations provide a certain amount of protection, in the form of redundancy data. This redundancy data insuring the unique identity of the data against data corruption or loss during transmission, storage, and/or read back. Some of the methods for doing this include block identity, various level checksums (sector or block level), as well as other known techniques, such as parity, CRC, ECC. For RAID systems and similar multi-storage device arrays which apply sufficient data protection, a parity string and/or other redundancy data for a region of data can also represent the fingerprint of the data blocks in the region of data. The use of parity data for the dual purpose of data protection and de-duplication fingerprinting is illustrated in example 200 of FIG. 2.

With continued reference to FIG. 2, received data is striped onto four data disks: disk 121, disk 122, disk 123, and disk 124. Redundancy data, which in this example comprises parity data, is stored on a single parity disk (disk 125). A disk sector is sixteen bytes, and two sectors are illustrated. A parity group is equal to sixteen data bytes plus four parity bytes. Eight parity groups, 221, 222, 223, 224, 225, 226, 227, and 228, are shown. Parity bytes are annotated as follows: $P_{sector, group, byte}$. Three data files, R, S, and T have been stored. Data file R comprises 57 bytes ($R_0$-$R_{56}$); data file S comprises 23 bytes ($S_0$-$S_{22}$); and data file T comprises 13 bytes ($T_0$-$T_{12}$). In the embodiment illustrated by example 200, files/blocklets always begin storage at parity group boundaries and are padded to exactly fit a parity group. The padding, represented by padded data byte 210, is a pre-determined consistent data pattern such as all ones, all zeros, or some other predetermined data pattern. Such padding is not required in all embodiments. However, filling unused space in a parity group with padding allows redundancy data generator 112 to calculate parity only on "full" parity groups, and prevents the presence of a random data pattern in the otherwise unused space of a parity group from having unpredictable effects upon the calculation of parity for a parity group. This ensures consistency in parity between parity groups which comprise identical stored data.

Bytes of a received file data are allocated to one disk (e.g., disk 121) until that disk's segment of a parity group is full. Allocation then continues in stripes on successive disks until a parity group is full. Allocation then continues in the next available parity group, possibly in a new sector. It is appreciated that file data may be buffered so that all file data being written to a single disk may be written in a single writing session before moving on to write file data to the next disk. For example, in one embodiment, data bytes $R_0$-$R_3$, $R_{16}$-$R_{19}$, $R_{32}$-$R_{35}$, and $R_{48}$-$R_{51}$, are buffered and written to disk 121 in a single writing session before moving on to write data to disk 122.

As illustrated in example 200, in one embodiment, de-duplication fingerprint definer 114 defines redundancy data $P_{0, 0, 0}$ through $P_{0, 3, 3}$ as a de-duplication fingerprint 230 for the region encompassing data stored in sector zero of the disks of the data storage system. In one embodiment, this de-duplication fingerprint is a data string comprised of this selection of redundancy data. Likewise, in such an embodiment, de-duplication fingerprint definer 114 defines redundancy data $P_{1, 0, 0}$ through $P_{1, 3, 3}$ as a de-duplication fingerprint 240 for the region encompassing data stored in sector one of the disks of the data storage system. De-duplication fingerprints 230 and 240 can then be used by data de-duplicator 116 to search for matches within the redundancy data stored on disk 125. In one embodiment, when a match is found it is assumed to be identical and data de-duplicator 116 performs data de-duplication. In another embodiment, after a match is found, data de-duplicator 116 performs additional comparisons to ensure that the match is due to identical data, and if so, data de-duplicator 116 performs data de-duplication.

It is appreciated that de-duplication fingerprint definer 114 can be set or configured to define longer or shorter de-duplication fingerprints than de-duplication fingerprints 230 and 240. Consider an example, in one embodiment, where de-duplication fingerprint definer 114 defines redundancy data $P_{0, 0, 0}$ through $P_{0, 0, 3}$ as a de-duplication fingerprint for the region encompassing data stored in parity group 221. This is a rather short de-duplication fingerprint comprising only a string of parity data, and thus matches to it which are noted by data de-duplicator 116 may not comprise identical data to parity group 221. Consider another example, in one embodiment, where de-duplication fingerprint definer 114 defines redundancy data $P_{0, 0, 0}$ through $P_{1, 3, 3}$ as a de-duplication fingerprint for the region encompassing data stored in all of section 0 and section 1 of the illustrated data storage system. This is a longer de-duplication fingerprint. Because of its length, it is more likely to be unique. Thus, when data de-duplicator 116 notes matches to this longer de-duplication fingerprint, the matches are more statistically likely to comprise identical data to the data stored in section 0 and section 1 of the illustrated storage system than matches obtained when employing the shorter de-duplication fingerprint described above. As can be seen, in this example, no additional storage overhead is incurred to de-duplicate on a smaller region of data versus a larger region of data. Rather, de-duplication fingerprint definer 114 simply defines a different de-duplication fingerprint which encompasses a collection of redundancy data associated with the smaller region.

FIG. 3 shows an example 300 of stored data in conjunction with unified redundancy data and de-duplication fingerprints, according to an embodiment. Example 300 illustrates another implementation of the simplified five-disk RAID previously described in example 200. The implementation in example 300 differs from example 200 in that, in addition to parity data, CRC data for each file R, S, and T is generated by redundancy data generator 112 and stored in conjunction with and in association with the storage of the respective file data. As illustrated in the embodiment of example 200, $CRC_{R0}$ through $CRC_{R4}$ are generated from and stored with data file R; $CRC_{S0}$ through $CRC_{S4}$ are generated from and stored with data file S; and $CRC_{T0}$ through $CRC_{T4}$ are generated from and stored with data file T. In some embodiments, these CRCs may also be generated from padded data which is used to pad out a region which will store a data file. File sizes, sector sizes, block sizes, and parity groups are defined in the same manner. Likewise, data is allocated and stored to disks and parity groups and padded in the same manner as in example 200. However, as can be seen, four byte file/blocklet CRCs are generated by redundancy data generator 112 and stored in the last four bytes of the final parity group associated with a file.

Due to the inclusion of CRC data, upon which parity is calculated, parity groups 324, 326, and 328 of example 300 differ from their counterpart parity groups (224, 226, and 228), which are shown in example 200. The redundancy data of disk 125 (e.g., parity data $P_{0, 0, 0}$ through $P_{1, 3, 3}$) is generated from data; data and other redundancy data (e.g., CRC data) generated from the data; and/or data, padded data, and other redundancy data generated from the data. Consider in example 300, where $CRC_{R0}$, $CRC_{R1}$, $CRC_{R2}$, and $CRC_{R3}$ are each generated from some portion of data file R. In this illustrated embodiment, redundancy data $P_{0,3,0}$ is generated from $R_{48}$, $R_{52}$, $R_{56}$, and $CRC_{R0}$. Similarly, in this illustrated embodiment, redundancy $P_{0,3,1}$ is generated from data $R_{49}$, $R_{53}$, one byte of padded data from disk 123, and $CRC_{R1}$. By generating redundancy data from both data and other redundancy data generated from the data, at least a portion of the parity data on disk 125 (in example 300) is second level redundancy data which is very sensitive to any change within the data which it protects (e.g., data file R, data file S, or data file T in this example).

Example 300 illustrates an implementation of an embodiment where a RAID or other data storage system with simple parity does not provide sufficient native protection to also ensure the unique attributes desired for a de-duplication fingerprint or for data protection desired by a user. Thus, a CRC has been added at the end of data segment cut points. In this example, the cut points are set to be at the end of each stored data file, but could be set at some other location, such as after data indicating a period or carriage return, after the end of a sector, or after a pre-defined block of parity groups. It is appreciated that some data storage system implementations may provide such CRC data. In other embodiments, such CRC data can be added to an existing data storage system implementation.

As illustrated in example 300, in one embodiment, de-duplication fingerprint definer 114 defines redundancy data $P_{0, 0, 0}$ through $P_{0, 3, 3}$ as a de-duplication fingerprint 330 for the region encompassing data stored in $R_0$ through $P_{0, 3, 3}$. In one embodiment, this de-duplication fingerprint is a data string comprised of this selection of redundancy data. Likewise, in one such embodiment, de-duplication fingerprint definer 114 defines redundancy data $P_{1, 0, 0}$ through $P_{1, 1, 3}$ as a de-duplication fingerprint 340 for the region encompassing data stored in $S_0$ through $P_{1, 1, 3}$. Additionally, in one such embodiment, de-duplication fingerprint definer 114 defines redundancy data $P_{1, 2, 0}$ through $P_{1, 3, 3}$ as a de-duplication fingerprint 350 for the region encompassing data stored in $T_0$ through $P_{1, 3, 3}$. De-duplication fingerprints 330, 340, and 350 can then be used by data de-duplicator 116 to search for matches within the redundancy data stored in the data storage system of example 300. In one embodiment, when a match is found it is assumed to be identical and data de-duplicator 116 performs data de-duplication. In another embodiment, after a match is found, data de-duplicator 116 performs additional comparisons to ensure that the match is due to identical data, and if so, data de-duplicator 116 performs data de-duplication.

As can be seen in a comparison to example 200, little to no additional storage overhead is incurred to define the de-duplication fingerprints of example 300. As with example 200, it is appreciated that de-duplication fingerprint definer 114 can be set or configured to define longer or shorter de-duplication fingerprints than de-duplication fingerprints 330, 340, and 350. Consider an example, in one embodiment, where de-duplication fingerprint definer 114 defines redundancy data $P_{0, 0, 0}$ through $P_{0, 0, 3}$ as a de-duplication fingerprint for the region encompassing data stored in parity group 221. This is a de-duplication fingerprint for a smaller range of data than the region represented by de-duplication fingerprint 330 and does not include any second level redundancy data (e.g., $P_{0,3,0}$-$P_{0,3,3}$). Thus due to its shorter string length and lack of second level redundancy data, this de-duplication fingerprint has less uniqueness than de-duplication fingerprint 330 and is similar to the parity only de-duplication fingerprints shown in example 200. As can be seen, no additional storage overhead is incurred to de-duplicate on a smaller region of data versus a larger region of data. Rather, de-duplication fingerprint definer 114 simply defines a different de-duplication fingerprint which encompasses a collection of redundancy data associated with the smaller region. However, it is appreciated that some robustness can be lost when available secondary redundancy data is not included in the de-duplication fingerprint which is defined.

FIG. 4 shows an example 400 of stored data in conjunction with unified redundancy data and de-duplication fingerprints, according to an embodiment. Example 400 illustrates another implementation of the simplified five-disk RAID previously described in examples 200 and 300. The implementation in example 400 differs from example 200 in that, in addition to parity data, ECC data for each file R, S, and T is generated by redundancy data generator 112 and stored in conjunction with and in association with the storage of the respective file data. As illustrated in the embodiment of example 400, $ECC_{R0}$ through $ECC_{R4}$ are generated from and stored with data file R; $ECC_{S0}$ through $ECC_{S4}$ are from generated and stored with data file S; and $ECC_{T0}$ through $ECC_{T4}$ are generated from and stored with data file T. In some embodiments, these ECCs may also be generated from padded data which is used to pad out a region which will store a data file. File sizes, sector sizes, block sizes, and parity groups are defined in the same manner. Likewise, data is allocated and stored to disks and parity groups and padded in the same manner as in example 200. However, as can be seen, four byte file/blocklet ECCs are generated by redundancy data generator 112 and stored in the last four bytes of the final parity group associated with a file.

Due to the inclusion of ECC data, upon which some parity is calculated, parity groups 424, 426, and 428 of example 400 differ from their counterpart parity groups (224, 226, and 228), which are shown in example 200. The redundancy data of disk 125 (e.g., parity data $P_{0, 0, 0}$ through $P_{1, 3, 3}$) is generated from data; data and other redundancy data (e.g., ECC data) generated from the data; and/or data, padded data, and other redundancy data generated from the data. Consider in example 400, where $ECC_{R0}$, $ECC_{R1}$, $ECC_{R2}$, and $ECC_{R3}$ are each generated from some portion of data file R. In this illustrated embodiment, redundancy data $P_{0,3,0}$ is generated from $R_{48}$, $R_{52}$, $R_{56}$, and $ECC_{R0}$. Similarly, in this illustrated embodiment, redundancy data $P_{0,3,1}$ is generated from $R_{49}$, $R_{53}$, one byte of padded data from disk 123, and $ECC_{R1}$. By generating redundancy data from both data and other redundancy data generated from the data, at least a portion of the parity data on disk 125 (in example 400) is second level redundancy data which is very sensitive to any change within the data which it protects (e.g., data file R, data file S, or data file T in this example).

Example 400 illustrates an implementation of an embodiment where a RAID or other data storage system with simple parity does not provide sufficient native protection to also ensure the unique attributes desired for a de-duplication fingerprint or for data protection desired by a user. Thus, a ECC has been added at the end of data segment cut points. In this example, the cut points are set to be at the end of each stored data file, but could be set at some other location, such as after data indicating a period or carriage return, after the end of a sector, or after a pre-defined block of parity groups. It is appreciated that some data storage system implementations may provide such ECC data. In other embodiments, such ECC data can be added to an existing data storage system implementation.

As illustrated in example 400, in one embodiment, de-duplication fingerprint definer 114 defines redundancy data $P_{0,0,0}$ through $P_{0,3,3}$ as a de-duplication fingerprint 430 for the region encompassing data stored in $R_0$ through $P_{0,3,3}$. In one embodiment, this de-duplication fingerprint is a data string comprised of this selection of redundancy data. Likewise, in one such embodiment, de-duplication fingerprint definer 114 defines redundancy data $P_{1,0,0}$ through $P_{1,1,3}$ as a de-duplication fingerprint 440 for the region encompassing data stored in $S_0$ through $P_{1,1,3}$. Additionally, in one such embodiment, de-duplication fingerprint definer 114 defines redundancy data $P_{1,2,0}$ through $P_{1,3,3}$ as a de-duplication fingerprint 450 for the region encompassing data stored in $T_0$ through $P_{1,3,3}$. De-duplication fingerprints 430, 440, and 450 can then be used by data de-duplicator 116 to search for matches within the redundancy data stored in the data storage system of example 400. In one embodiment, when a match is found it is assumed to be identical and data de-duplicator 116 performs data de-duplication. In another embodiment, after a match is found, data de-duplicator 116 performs additional comparisons to ensure that the match is due to identical data, and if so, data de-duplicator 116 performs data de-duplication.

As can be seen in a comparison to example 200, little to no additional storage overhead is incurred to define the de-duplication fingerprints of example 400. As with examples 200 and 300, it is appreciated that de-duplication fingerprint definer 114 can be set or configured to define longer or shorter de-duplication fingerprints than de-duplication fingerprints 430, 440, and 450. Consider an example, in one embodiment, where de-duplication fingerprint definer 114 defines redundancy data $P_{0,0,0}$ through $P_{0,0,3}$ as a de-duplication fingerprint for the region encompassing data stored in parity group 221. This is a de-duplication fingerprint for a smaller range of data than the region represented by de-duplication fingerprint 430 and does not include any second level redundancy data (e.g., $P_{0,3,0}$-$P_{0,3,3}$). Thus due to its shorter string length and lack of second level redundancy data, this de-duplication fingerprint has less uniqueness that de-duplication fingerprint 430 and is similar to the parity only de-duplication fingerprints shown in example 200. As can be seen, no additional storage overhead is incurred to de-duplicate on a smaller region of data versus a larger region of data. Rather, de-duplication fingerprint definer 114 simply defines a different de-duplication fingerprint which encompasses a collection of redundancy data associated with the smaller region. However, it is appreciated that some robustness can be lost when available secondary redundancy data is not included in the de-duplication fingerprint which is defined.

Example Methods of Operation

Figure 5:
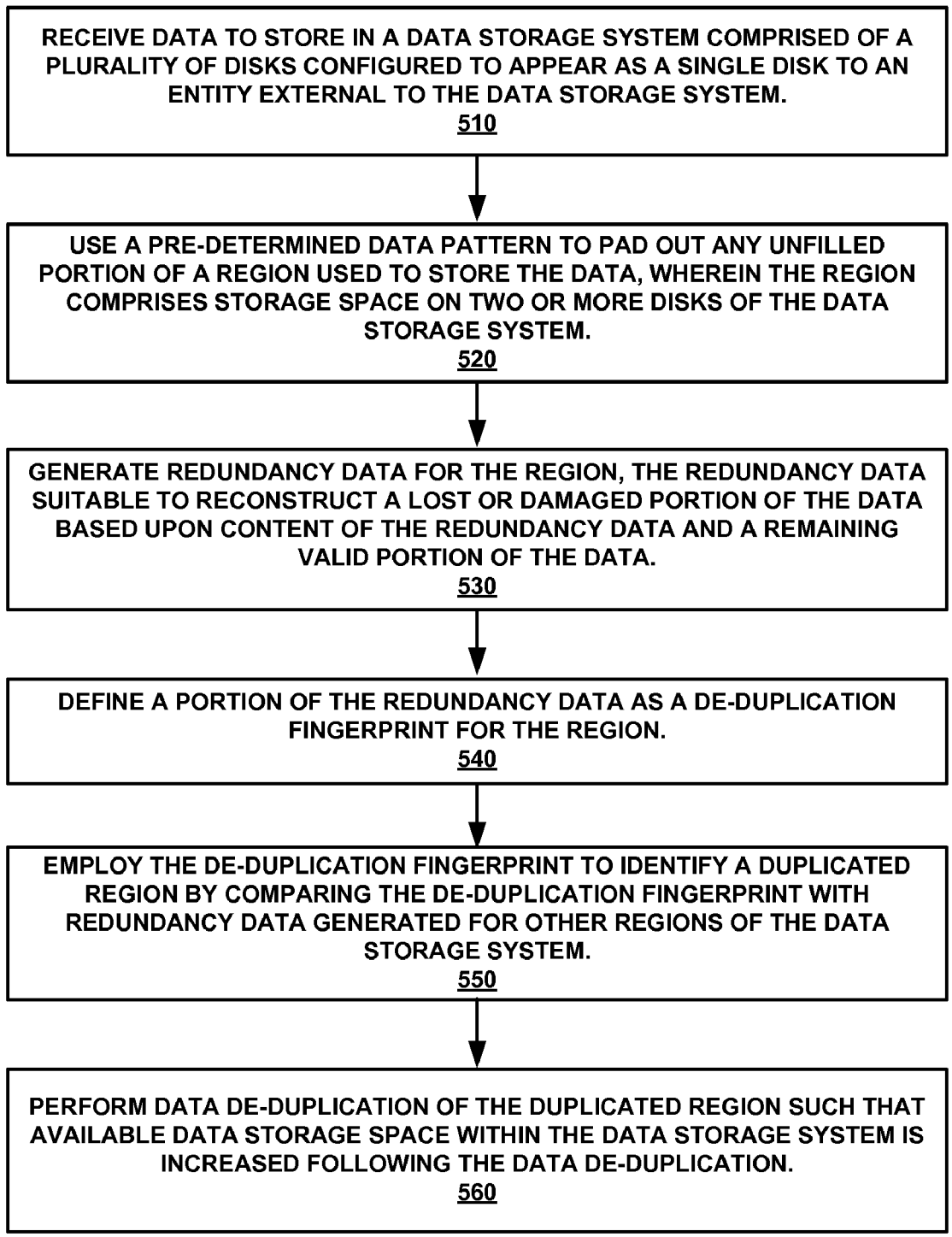
FIG. 5 shows flow diagram of an example method of unified data protection and data de-duplication, according to an embodiment.

The following discussion sets forth in detail the operation of some example embodiments. With reference to FIG. 5 and FIG. 7, flow diagrams 500 and 700 illustrate example procedures used by various embodiments. Although a specific flow of procedures is disclosed in flow diagrams 500 and 700, such a flow is provided as an example. That is, embodiments are well suited to performing various other procedures or variations of the procedures recited in flow diagrams 500 and 700. It is appreciated that the procedures in flow diagrams 500 and 700 may be performed in an order different than presented, and that not all of the procedures in flow diagram 500 and 700 may be performed in every embodiment.

Moreover, flow diagrams 500 and 700 include processes that, in various embodiments, are carried out by a processor under the control of computer-readable and computer-executable instructions. The computer-readable and computer-executable instructions for executing the methods illustrated by flow diagrams 500 and 700 reside, for example, in any tangible computer-readable media, such as data storage features internal or external to storage system 101 and/or data storage system 101. For example, in one embodiment, the computer-readable and computer-executable instructions, reside on computer-readable media such as a ROM or firmware of a microcontroller which, is/are used to perform the functions of, or operate in conjunction with, for example, storage system controller 110. In another example, such computer-readable and computer-executable instructions may reside on a computer-readable storage media such as a diskette (e.g., a Compact Disc Read Only Memory (CD-ROM)) which is used to control operation of a processor in a computer system (e.g., computer system 100) which is coupled with storage system controller 110.

Example Method of Unified Data Protection and Data De-duplication in a Data Storage System FIG. 5 shows a flow diagram of an example method of unified data protection and data de-duplication, according to an embodiment. Reference will be made to components and portions of FIGS. 1, 2, 3, 4, and 6 to assist in the description of the procedures of the method illustrated by flow diagram 500.

At 510 of flow diagram 500, in one embodiment, the method receives data to stripe into storage in a data storage system comprised of a plurality of disks configured to appear as a single disk to an entity external to the data storage system. The received data can be a data file, data stream, or some other form of data, and can be received from a computer system, such as computer system 100, or from some other data source. The data storage system can comprise a data storage system, such as data storage system 101 of FIG. 1. The data storage system is comprised of multiple storage devices 120 which, in one embodiment, are hard disk drives. In one embodiment, the data storage system is implemented as a RAID architecture or modified RAID architecture, and storage devices 120 comprises hard disk drives such as disks 121-125 which are a part of the architecture. FIG. 1 shows one example of data striping, where data 105 is split up and stored in part (striped) onto each of several storage devices (typically at least two storage devices) of a plurality of storage devices. Data striping is also illustrated in FIGS. 2, 3, and 4, by the manner that files R, S, and T are stored, in part, on each of disk 121, 122, 123, and 124. This striping is done for data protection purposes and allows only small portions of the data to be lost, and thus in need of recovery, if a particular storage device fails or malfunctions. A controller, such as storage system controller 110, operates to cause storage devices 120 of a storage system 101 to appear as a single storage device to an outside entity such as computer system 100 or a user of computer system 100. A discussion of one example of this operation has been described previously herein.

At 520 of flow diagram 500, in one embodiment, the method uses a pre-determined data pattern to pad out any unfilled portion of a region used to store the data. The "region" comprises storage space on two or more disks of the data storage system. Sector zero of the disks of the data storage system depicted in example 200 (FIG. 2) is one example of a region used to store data. Sector one, byte zero through sector one, byte eight of the disks of the data storage system depicted in example 200 is another example of a region used to store data. As previously described with respect to FIGS. 2, 3, and 4, the pre-determined data pattern can comprise a pattern such as all zeros, all ones, or some other pattern. As an example, padded data byte 210 is denoted in FIGS. 2, 3, 4, and 6. It is appreciated that other data bytes in FIGS. 2, 3, 4, and 6 represented as three dashes, "- - -", also constitute padded data bytes.

In one embodiment, a pre-determined data pattern is used to pad out space of a data storage region which is unused for storage of data or for storage of data protection redundancy data which is associated with the data (e.g., parity data, CRC data, ECC data, and/or other redundancy data). The padding can be a standard part of a data protection implementation, such as a RAID implementation, or can be added to ensure better data protection and assist in the unified use of the redundancy data for de-duplication purposes. The padding allows redundancy data generator 112 to calculate redundancy data only on fully packed ranges of data, such as parity groups. This padding out, or filling of the data ranges, prevents the presence of a random data pattern in the otherwise unused space of a parity group or data range from having unpredictable effects upon the calculation of redundancy data for the data stored therein.

At 530 of flow diagram 500, in one embodiment, the method generates redundancy data for the region. The generated redundancy data is suitable to reconstruct a lost or damaged striped portion of the stored data based upon content of the redundancy data and a remaining valid portion of the data that is stored in the storage system. In one embodiment, the redundancy data is generated by redundancy data generator 112. In some embodiments, redundancy data generator 112 can generate various types of redundancy data from received data and/or particular regions. Some examples include: parity data, CRC data, ECC data, and/or combinations thereof. In some embodiments, the redundancy data is RAID redundancy data. In one embodiment, the RAID redundancy data is the redundancy data that is generated in the normal operation of a RAID.

The generated redundancy data can comprise a single level of redundancy data or multiple levels of redundancy data. For example, in some embodiments a first level of redundancy data can be generated from the received data and then stored in conjunction with and in association with the received data. Then a second level of redundancy data can be generated from the data and/or combinations of the received data, padded space, and the first level of redundancy data. Parity groups 324, 326, and 328 of example 300 and 424, 426, and 428 of example 400 show some embodiments where at least some second level of redundancy data is generated.

With respect to the examples illustrated in FIGS. 1-4, received data is depicted as if it is actually stored in a storage system before redundancy data is generated and de-duplication fingerprints and processes are defined and performed. However, it is appreciated that padding and generation of one or more levels of redundancy data can be performed by storage system controller 110 before the storage of received data. This permits defining a de-duplication fingerprint and performing some or all de-duplication processes either before or after received data is actually stored onto media of a data storage system.

At 540 of flow diagram 500, in one embodiment, the method defines a portion of the redundancy data as a de-duplication fingerprint for the region. In one embodiment, this comprises defining the de-duplication fingerprint to include a range of the redundancy data which is generated for the region. With reference to example 200 of FIG. 2, in an embodiment where the region is equivalent to sector zero of the disks of the data storage system, de-duplication fingerprint definer 114 defines de-duplication fingerprint 230 from a range of redundancy data stored or to be stored in sector zero of the disks of the data storage system. As previously described and shown in examples 200, 300, and 400, de-duplication fingerprint definer 114 can define a de-duplication fingerprint to include redundancy data generated strictly from the received data for the region and/or for some combination of received data, padded data, and other redundancy data which has been previously generated. Thus, all or some portion of a de-duplication fingerprint can comprise second level redundancy data that is generated at least in part from other redundancy data associated with the received data.

At 550 of flow diagram 500, in one embodiment, the method employs the de-duplication fingerprint to identify a duplicated region of data in the data storage system by comparing the de-duplication fingerprint with redundancy data generated for other regions of the data storage system.

FIG. 6 shows an example 600 of stored data, unified redundancy data and de-duplication fingerprints, and matching de-duplication fingerprints, according to an embodiment. Example 600 is the same as example 300 of FIG. 3, except that instead of file blocklet T, file/blocklet U is received as data. For purposes of this example, file/blocklet U comprises 23 bytes of data which are identical to the 23 bytes of data of file/blocket S. File/blocklet U is stored in parity groups 627 and 628 and empty space not used for parity data or first level CRC data ($ECC_{U0}$ through $ECC_{U3}$) is padded out as represented by padded data byte 210. De-duplication fingerprint definer 114 defines de-duplication fingerprint 650 to represent the data of File/blocklet U. In this example, de-duplication fingerprint 650 comprises identical redundancy data to that of de-duplication fingerprint 340. Continuing with this example, when data de-duplicator 116 compares de-duplication fingerprint 340 within the redundancy data shown in example 300, a match will be found with the redundancy data which comprises de-duplication fingerprint 650. This match indicates that the data in the region of sector one, byte zero through sector one, byte seven of the disks of the data storage system is identical (or very likely to be identical) to data in the region of sector one, byte eight through sector one, byte fifteen of the disks of the data storage system.

In various embodiments, depending upon the uniqueness of the de-duplication fingerprint employed, the odds of an exact match are so high that a match can be presumed as an indicator of duplicated data. In embodiments, where a less unique de-duplication fingerprint is employed or an extra cautious approach is taken, a match is considered to constitute a high very high likelihood that the matched region comprises a duplicate of the data in the region represented by the de-duplication fingerprint. Extra checks such as a bit wise comparison of the matched regions can be performed to verify whether or not the regions comprise exactly matching data.

At 560 of flow diagram 500, in one embodiment, the method performs data de-duplication of the duplicated region such that available data storage space within the data storage system is increased following the data de-duplication. This data de-duplication, as previously described comprises storing a code or pointer in the place of the data which has been identified to be a duplication of data stored elsewhere. Consider again, example 600, where data de-duplicator 116 has found a match to de-duplication fingerprint 340. In one embodiment, data de-duplicator 116 performs data de-duplication by storing a pointer or some code which references the data in the region of sector one, byte zero of the disks of the data storage system. This code or pointer is stored in a place of a portion of the data in the region of sector one, byte eight to sector one, byte fifteen of the disks of the data storage system. All or a portion of the remainder of the region, which is not used for the code or pointer, is then freed up for the storage of additional data. This increases the amount of storage space available.

Example Method of Determining Duplicated Data in a Redundant Array of Independent Disks FIG. 7 shows a flow diagram 700 of an example method of determining duplicated data in a redundant array of independent disks (RAID), according to an embodiment. Reference will be made to components and portions of FIGS. 1, 2, 3, 4, and 6 to assist in the description of the procedures of the method illustrated by flow diagram 700.

At 710 of flow diagram 700, in one embodiment, the method accesses redundancy data of a RAID. The accessed redundancy data comprises information suitable to reconstruct a lost or damaged portion of data striped in a region of the RAID. Such reconstruction is based upon the redundancy data and a remaining valid portion of the data which the redundancy data is generated for and from. The region in question is a region comprising storage space on at least two disks of a RAID. This precludes RAID level-zero and RAID level-1. This encompasses numerous other standard RAID levels which stripe data to two or more disks (e.g., RAID level 2, RAID level-3, RAID level-4, RAID level-5, RAID level-6, RAID level-7), and includes numerous combinations of RAID levels, and proprietary RAIDS which stripe data to two or more disks. It is appreciated that the accessing can be performed before, during, or after the received data and the redundancy data are stored to the media of the RAID. Thus in some embodiments, it is apparent that redundancy data for data to be stored in a RAID is generated before storage of data in the RAID. With reference to Example 200, in one embodiment, this comprises accessing the redundancy data represented by $P_{0, 0, 0}$ through $P_{1, 3, 3}$ on disk 125. Following this example, the "region" comprises sector zero, byte zero through sector zero, byte fifteen of the disks of the data storage system depicted in example 200. It is appreciated that redundancy data for other region sizes can be accessed. Although this example illustrates the redundancy data as parity data, it is appreciated that the redundancy data can comprise or include other redundancy data such as CRC data, ECC data, and the like which are generated for the region.

Additionally, as illustrated in example 300 and example 400, in some embodiments the accessed redundancy data is redundancy data generated for a region which includes CRC data, ECC data, or other additional redundancy data generated from the data. Thus, the some or all of the accessed redundancy data may comprise second level redundancy data generated from a combination including data and other previously generated redundancy data. Consider example 300, where $CRC_{R0}$, $CRC_{R1}$, $CRC_{R2}$, and $CRC_{R3}$ are each generated from some portion of data file R. In this illustrated embodiment, redundancy data $P_{0,3,0}$ is generated from data $R_{48}$, $R_{52}$, $R_{56}$, and $CRC_{R0}$. Similarly, in this illustrated embodiment, redundancy data $P_{0,3,1}$ is generated from data $R_{49}$, $R_{53}$, one byte of padded data from disk 123, and $CRC_{R1}$. Consider also example 400, where $ECC_{R0}$, $ECC_{R1}$, $ECC_{R2}$, and $ECC_{R3}$ are each generated from some portion of data file R. In this illustrated embodiment, redundancy data $P_{0,3,0}$ is generated from data $R_{48}$, $R_{52}$, $R_{56}$, and $ECC_{R0}$. Similarly, in this illustrated embodiment, redundancy data $P_{0,3,1}$ is generated from data $R_{49}$, $R_{53}$, one byte of padded data from disk 123, and $ECC_{R1}$.

By generating redundancy data on both data and other redundancy data generated from the data, the second level redundancy data generated becomes very sensitive to any change within the data which it protects. Naked parity data, as shown in example 200, might be the same for some data streams which are similar but not identical. For example, two data files which are identical except for transposition of two bits in a byte of data can comprise identical parity data to one another in example 200. However, the parity data of disk 125, as shown in examples 300 and 400, includes a portion of parity data which is sensitive to an entire region (e.g., data file R, S, or T) for which CRC or ECC data has been generated. This causes the parity data of examples 300 and 400 to be more robust and more uniquely associated with the data which it represents. Thus a transposition of bits which might result in no change in parity data in example 200 will be very likely to result in a change to the parity data of examples 300 and 400.

At 720 of flow diagram 700, in one embodiment, the method defines a portion of the accessed redundancy data as a de-duplication fingerprint for the region. The portion of redundancy data comprises redundancy data for the region. Following the previous example, in one embodiment, de-duplication fingerprint definer 114 defines redundancy data $P_{0, 0, 0}$ through $P_{0, 3, 3}$ of disk 125 to be a de-duplication fingerprint (de-duplication fingerprint 230) for the region comprising sector zero, byte zero through sector zero, byte fifteen of the disks of the data storage system depicted in Example 200. This is an example of only first level redundancy data being included in a de-duplication fingerprint. In other embodiments, de-duplication fingerprint definer 114 defines a data de-duplication fingerprint which includes at least some second level redundancy data. Reference is made to de-duplication fingerprint 324 of example 300 which shows a de-duplication fingerprint comprising second level redundancy data which has been generated at least partially from previously generated CRC data. Reference is made to de-duplication fingerprint 424 of example 400 which shows a de-duplication fingerprint comprising second level redundancy data which has been generated at least partially from previously generated ECC data.

At 730 of flow diagram 700, in one embodiment, the method determines a duplicated region within the RAID by comparing the de-duplication fingerprint for a match within the redundancy data of the RAID. The duplicated region determined in this fashion will, in one embodiment, comprise duplicate data to the data stored in the region represented by the de-duplication fingerprint. In various embodiments, depending upon the uniqueness of the de-duplication fingerprint employed, the odds of an exact match are so high that a match can be presumed as an indicator of duplicated data. In embodiments, where a less unique de-duplication fingerprint is employed or an extra cautious approach is taken, a match is considered to constitute a high very high likelihood that the matched region comprises a duplicate of the data in the region represented by the de-duplication fingerprint. Extra checks such as a bit wise comparison of the two regions can be performed to verify whether or not the regions comprise exactly matching data. Reference is made to FIG. 6 and to the description provided in conjunction with procedure 550 of flow diagram 500 for additional explanation of determining a duplicated region.

At 740 of flow diagram 700, in one embodiment, the method performs data de-duplication of the duplicated region such that available data storage space within the RAID is increased following the data de-duplication. This data de-duplication is performed in a manner consistent with the manner described in conjunction with procedure 560 of the method of flow diagram 500, and in the interests of brevity and clarity, reference is made to this previous description for further explanation.

Example Computer System Environment

Figure 8:
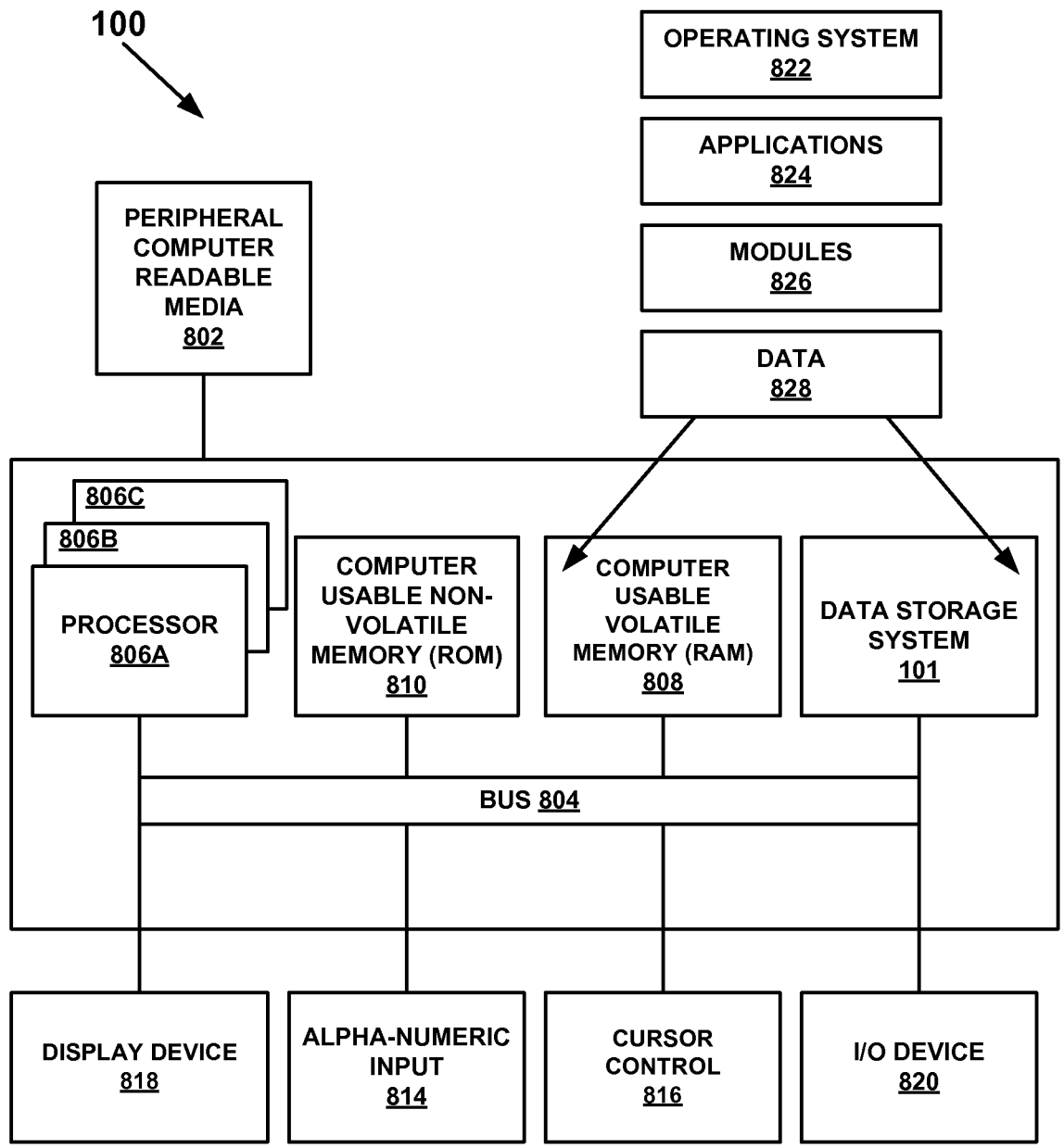
FIG. 8 shows a block diagram of an example computer system, according to an embodiment.

FIG. 8 shows a block diagram of an example computer system 100 (also shown in FIG. 1), according to an embodiment. With reference now to FIG. 8, portions of the subject matter comprise or can comprise computer-readable and computer-executable instructions that reside, for example, in computer-usable media of a computer system. That is, FIG. 8 illustrates one example of a type of computer that can be used to implement embodiments of the subject matter which are discussed herein. FIG. 8 illustrates an example computer system 100 used in accordance with embodiments of the subject matter. It is appreciated that computer system 100 of FIG. 8 is an example, and that the subject matter can operate on or within a number of different computer systems including general purpose networked computer systems, embedded computer systems, optical computer systems, virtual computer systems, database systems, server devices, client devices, various intermediate devices/nodes, stand alone computer systems, and the like. As shown in FIG. 8, computer system 100 of FIG. 8 is well adapted to having peripheral computer readable media 802 such as, for example, a floppy disk, a compact disc, and the like coupled thereto.

Computer system 100 of FIG. 8 includes an address/data bus 804 for communicating information, and a processor 806A coupled to bus 804 for processing information and instructions. As depicted in FIG. 8, computer system 100 is also well suited to a multi-processor environment in which a plurality of processors 806A, 806B, and 806C are present. Conversely, computer system 100 is also well suited to having a single processor such as, for example, processor 806A. Processors 806A, 806B, and 806C may be any of various types of microprocessors.

Computer system 100 also includes data storage features such as a computer usable volatile memory 808, e.g. random access memory (RAM), coupled to bus 804 for storing information and instructions for processors 806A, 806B, and 806C. Computer system 100 also includes computer usable non-volatile memory 810, e.g. read only memory (ROM), coupled to bus 804 for storing static information and instructions for processors 806A, 806B, and 806C. Also present in computer system 100 is a data storage system 101 (e.g., a plurality of magnetic or optical disks and drives and/or solid state storage units) coupled to bus 804 for storing information and instructions.

Computer system 100 also includes, in one embodiment, an optional alphanumeric input device 814 including alphanumeric and function keys coupled to bus 804 for communicating information and command selections to processor 806A or processors 806A, 806B, and 806C. Computer System 100 also includes, in one embodiment, an optional cursor control device 816 coupled to bus 804 for communicating user input information and command selections to processor 806A or processors 806A, 806B, and 806C. Computer system 100 of the present embodiment also includes, in one embodiment, an optional display device 818 coupled to bus 804 for displaying information.

Referring still to FIG. 8, optional display device 818 may be a liquid crystal device, cathode ray tube, plasma display device or other display device suitable for creating, presenting, or displaying graphic images and/or symbols or alphanumeric characters recognizable to a user. Optional cursor control device 816 allows the computer user to dynamically signal the movement of a visible symbol (cursor) on a display screen of display device 818. Many implementations of cursor control device 816 are known in the art including a trackball, mouse, touch pad, joystick, directional and input keys on a multimedia remote control, or special keys on alpha-numeric input device 814 capable of signaling movement of a given direction or manner of displacement. Alternatively, it will be appreciated that a cursor can be directed and/or activated via input from alpha-numeric input device 814 using special keys and key sequence commands. Computer system 100 is also well suited to having a cursor directed by other means such as, for example, voice commands.

Computer system 100 also includes, in one embodiment, an I/O device 820 for coupling computer system 100 with external entities. For example, in one embodiment, I/O device 820 is a modem for enabling wired or wireless communications between computer system 100 and an external network such as, but not limited to, the Internet.

Referring still to FIG. 8, various other components are depicted for computer system 100 and may be included in various embodiments. Specifically, when present, an operating system 822, applications 824, modules 826, and data 828 are shown as typically residing in one or some combination of computer usable volatile memory 808, e.g. random access memory (RAM), and data storage system 101. In some embodiments, the subject matter discussed herein is stored, for example, as an application 824 or module 826 in memory locations within RAM 808, computer readable media within data storage system 101, and/or peripheral computer readable media 802.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data storage system comprising:
a plurality of storage devices arranged in a redundant array;
a storage system controller for controlling data and redundancy data stored to and read from the storage devices such that the data is stored at least in part by striping the data into a region that comprises storage areas on at least two of the storage devices and such that the plurality of storage devices appear as a single storage device to an entity external to the data storage system, the storage system controller comprising:
- a redundancy data generator operative to generate the redundancy data for the data, the redundancy data suitable to reconstruct a lost or damaged portion of the data based upon content of the redundancy data and a remaining valid portion of the data;
- a de-duplication fingerprint definer operative to define a portion of the redundancy data as dual purpose data that additionally represents a de-duplication fingerprint for the region, where the portion of the redundancy data that is defined as dual purpose data was created in the same operation that created the redundancy data, and where the portion of the redundancy data that is defined as dual purpose data is error correction code (ECC) data; and
- a data de-duplicator operative to identify a duplicated region based upon finding a match to the de-duplication fingerprint within the redundancy data of the data storage system.

2. The data storage system of claim 1, wherein said data de-duplicator is further operative to perform a de-duplication of said duplicated region such that available data storage space within said data storage system is increased following said data de-duplication.

3. The data storage system of claim 1, wherein said storage system controller comprises a hardware device.

4. The data storage system of claim 1, wherein said storage system controller comprises, at least partially, a virtual device implemented by a processor executing instructions which cause said processor to perform a function of said storage system controller.

5. The data storage system of claim 1, wherein said plurality of storage devices comprise a Redundant Array of Independent Disks (RAID) and said storage system controller comprises a RAID controller.

6. The data storage system of claim 1, wherein said de-duplication fingerprint comprises RAID redundancy data.

7. A method of unified data protection and data de-duplication in a data storage system, the method comprising:
- receiving data to stripe into storage in a data storage system comprised of a plurality of disks configured to appear as a single disk to an entity external to said data storage system;
- using a pre-determined data pattern to pad out any unfilled portion of a region used to store the data, where the region comprises storage space on two or more disks of the data storage system;
- generating redundancy data for the region, the redundancy data being suitable to reconstruct a lost or damaged striped portion of the data based upon the content of the redundancy data and a remaining valid portion of the data;
- defining a portion of the redundancy data as a dual-purpose data that also represents a de-duplication fingerprint for the region, where the portion of the redundancy data that is defined as dual purpose data is a subset of the redundancy data, where the subset was created in the same operation that created the redundancy data, and where the portion of the redundancy data that is defined as dual purpose data is error correction code (ECC) data; and
- employing the de-duplication fingerprint to identify a duplicated region by comparing the de-duplication fingerprint with redundancy data generated for other regions of the data storage system.

8. The method as recited in claim 7, further comprising:
- performing data de-duplication of said duplicated region such that available data storage space within said data storage system is increased following said data de-duplication.

9. The method as recited in claim 7, wherein said receiving data to stripe into storage in a data storage system comprised of a plurality of disks configured to appear as a single disk to an entity external to said data storage system comprises:
- receiving data to stripe into storage in a RAID storage system.

10. The method as recited in claim 7, wherein said using a pre-determined data pattern to pad out any unfilled portion of a region used to store said data comprises:
- using said pre-determined data pattern to pad out space of said region which is unused for storage of said data or for storage of said redundancy data.

11. The method as recited in claim 7, wherein said generating redundancy data for said region comprises:
- generating RAID redundancy data.

12. The method as recited in claim 7, wherein said defining a portion of said redundancy data as a de-duplication fingerprint for said region comprises:
- defining said de-duplication fingerprint to include a range of said redundancy data which is generated for said region.

13. The method as recited in claim 12, wherein said defining said de-duplication fingerprint to include a range of said redundancy data which is generated for said region comprises:
- defining said de-duplication fingerprint to include parity data generated for said region.

14. The method as recited in claim 12, further comprising:
- defining said de-duplication fingerprint to include second level redundancy data generated at least in part from CRC data which has been generated from said data.

15. The method as recited in claim 12, further comprising:
- defining said de-duplication fingerprint to include second level redundancy data generated at least in part from ECC data which has been generated from said data.

16. The method as recited in claim 15, wherein said defining said de-duplication fingerprint to include second level redundancy data generated at least in part from ECC data which has been generated from said data comprises:
- defining said de-duplication fingerprint to include second level redundancy data generated at least in part from Reed-Solomon ECC data which has been generated from said data.

17. A method of determining duplicated data in a redundant array of independent disks (RAID), the method comprising:
- accessing redundancy data of a RAID, said redundancy data suitable to reconstruct a lost or damaged portion of data striped in a region of said RAID based upon said redundancy data and a remaining valid portion of said data, said region comprising storage space on at least two disks of said RAID;
- defining a portion of said redundancy data as a de-duplication fingerprint for said region, said portion of redundancy data comprising redundancy data for said region, where the portion of the redundancy data that is defined as the de-duplication fingerprint is dual purpose data that is a subset of the redundancy data, where the subset was created as part of the same operation that created the redundancy data, and where the portion of the redundancy data that is defined as dual purpose data is error correction code (ECC) data; and determining a duplicated region within said RAID by comparing said de-duplication fingerprint for a match within said redundancy data.

18. The method as recited in claim 17, wherein said accessing redundancy data of a RAID comprises:
   accessing redundancy data generated for said region, wherein a portion of said region includes CRC data generated from said data.

19. The method as recited in claim 17, wherein said accessing redundancy data of a RAID comprises:
   accessing redundancy data generated for said region, wherein a portion of said region includes ECC data generated from said data.

20. The method as recited in claim 17, further comprising:
   performing data de-duplication of said duplicated region such that available data storage space within said RAID is increased following said data de-duplication.

21. The method as recited in claim 17, wherein said defining a portion of said redundancy data as a de-duplication finger for said region comprises:
   defining said de-duplication fingerprint to include parity data generated for said region.

* * * * *

UNITED STATES PATENT AND TRADEMARK OFFICE
CERTIFICATE OF CORRECTION

PATENT NO. : 8,392,791 B2  Page 1 of 1
APPLICATION NO. : 12/188876
DATED : March 5, 2013
INVENTOR(S) : Saliba et al.

It is certified that error appears in the above-identified patent and that said Letters Patent is hereby corrected as shown below:

On the Title Page, item [57], line 5, delete "on least" and insert --on at least--.

In the Specification

In column 1, line 4, delete "data in redundant" and insert --data in a redundant--.

In column 1, line 61, delete "on least" and insert --on at least--.

In column 8, line 59, delete "portion of portion" and insert --portion of--.

In column 9, line 11, delete "system" and insert --systems--.

In column 9, line 33, delete "insuring" and insert --insures--.

In column 9, line 37, delete "CRC, ECC." and insert --CRC, and ECC.--.

In column 12, line 46, delete "are from generated" and insert --are generated from--.

In column 12, line 62, delete "that" and insert --than--.

Signed and Sealed this
Twenty-second Day of October, 2013

Teresa Stanek Rea
*Deputy Director of the United States Patent and Trademark Office*